United States Patent [19]
Barth et al.

[11] Patent Number: 5,210,553
[45] Date of Patent: May 11, 1993

[54] PROGRESSIVE OPHTHALMIC LENS WITH POSITIVE DISTANCE POWER

[75] Inventors: Rudolf Barth, Pasenbach; Klaus Wehmeyer, Erdweg-Guggenberg, both of Fed. Rep. of Germany

[73] Assignee: Optische Werke G. Rodenstock, Munich, Fed. Rep. of Germany

[21] Appl. No.: 671,896

[22] PCT Filed: Jul. 17, 1990

[86] PCT No.: PCT/DE90/00535
§ 371 Date: Mar. 18, 1991
§ 102(e) Date: Mar. 18, 1991

[87] PCT Pub. No.: WO91/01508
PCT Pub. Date: Feb. 7, 1991

[30] Foreign Application Priority Data
Jul. 17, 1989 [DE] Fed. Rep. of Germany ....... 3923576

[51] Int. Cl.$^5$ ............................................. G02C 7/02
[52] U.S. Cl. .................................................. 351/169
[58] Field of Search ............... 351/168, 169, 170, 171, 351/172

[56] References Cited
U.S. PATENT DOCUMENTS
4,778,266 10/1988 Maitenaz ........................... 351/169

Primary Examiner—Scott J. Sugarman
Attorney, Agent, or Firm—Antonelli, Terry, Stout & Kraus

[57] ABSTRACT

Disclosed is a progressive ophthamic lens having positive distance portion power, in which at least one surface is designed as a progressive area, and a distance portion (FT) intended for distant vision having practically constant distance portion power and a near portion (NT) intended for hear vision having practically constant near portion power including a progression zone (PZ), in which the surface refractive power increases from the surface refractive power ($D_F$) present at the distant reference point ($B_F$) along a curved of plane main meridian (HM) to the surface refractive power ($D_N$) present at a near reference point ($B_N$).

10 Claims, 10 Drawing Sheets

FIG. 3

| y \ x | 0 | 4 | 8 | 12 | 16 | 24 | 36 |
|---|---|---|---|---|---|---|---|
| 36 | 78.41 | 78.40 | 78.81 | 80.20 | 82.20 | | |
| 28 | 79.97 | 79.82 | 79.90 | 81.03 | 83.04 | 86.04 | |
| 24 | 80.51 | 80.28 | 80.20 | 81.23 | 83.27 | 86.57 | 93.10 |
| 20 | 80.94 | 80.61 | 80.34 | 81.28 | 83.43 | 86.93 | 94.46 |
| 16 | 81.27 | 80.82 | 80.34 | 81.23 | 83.51 | 87.14 | 95.45 |
| 12 | 81.66 | 81.03 | 80.25 | 80.99 | 83.39 | 87.11 | 96.33 |
| 8 | 81.65 | 80.88 | 79.89 | 80.70 | 83.40 | 87.10 | 96.55 |
| 4 | 80.33 | 79.66 | 79.03 | 80.63 | 84.38 | 87.90 | 94.88 |
| 0 | 76.40 | 76.22 | 76.96 | 80.78 | 86.98 | 89.43 | 89.40 |
| -4 | 69.39 | 70.10 | 73.61 | 82.06 | 93.52 | 91.52 | 79.21 |
| -8 | 62.14 | 63.76 | 70.21 | 84.57 | 103.71 | 91.89 | 68.90 |
| -12 | 57.80 | 59.69 | 66.90 | 82.96 | 106.10 | 93.85 | 62.70 |
| -16 | 56.05 | 57.72 | 63.95 | 77.66 | 98.30 | 94.54 | 60.04 |
| -20 | 53.86 | 55.48 | 61.63 | 75.31 | 95.63 | 88.28 | 56.25 |
| -24 | 51.44 | 53.09 | 59.55 | 74.27 | 94.76 | 78.26 | 52.32 |
| -28 | 48.81 | 50.50 | 57.49 | 73.77 | 93.64 | 67.17 | |
| -36 | 42.69 | 44.53 | 53.22 | 73.67 | 83.76 | | |

(THE DATA IS ROUNDED OFF TO TWO DIGITS)

FIG. 4

| y | SURFACE ASTIMATISM IN dpt AT x = 0 |
|---|---|
| 36 | 0.57 |
| 32 | 0.52 |
| 28 | 0.46 |
| 24 | 0.38 |
| 20 | 0.29 |
| 16 | 0.22 |
| 12 | 0.14 |
| 8 | 0.07 |
| 4 | 0.03 |
| 0 | 0.10 |
| -4 | 0.23 |
| -8 | 0.16 |
| -12 | 0.14 |
| -16 | 0.32 |
| -20 | 0.61 |
| -24 | 0.89 |
| -28 | 1.12 |
| -32 | 1.30 |
| -36 | 1.38 |

PROGRESSIVE OPHTHALMIC LENS WITH POSITIVE DISTANCE POWER

TECHNICAL FIELD

The present invention relates to a progressive ophthamic lens having positive distance power, in which at least one surface is designed as a progressive area and which has a distance portion intended for distant vision with practically constant distance power and a near portion intended for near vision with practically constant near power including a progression zone, in which the surface refractive power increases from the surface refractive power at the distant reference point along a curved or plane main meridian to the surface refractive power at the near reference point.

STATE OF THE ART

An opthalmic lens of this type is known, by way of illustration, from DE 37 16 201. Moreover, express reference is made to this publication as well as to the other literature mentioned in this publication for the explanation of all the terms not made more apparent therein.

Initially, two different construction principles were pursued in the development of progressive ophthamic lenses:

In one principle of construction the progression zone, i.e. the area in which the power of the ophthamic lens, respectively in viewing only the progressive surface in which the surface refractive power of this surface increases from the value in the distance portion to the value in the near portion, is selected as long as possible in order to maintain a relatively low increase in progression which facilitates the correction of aberrations in the lateral regions.

Typical surfaces of this principle of construction are described in DE-PS 1 145 820 and in FIGS. 1 to 4 of U.S. Pat. No. 2 878 721.

In the other principle of construction the point of departure is a spherical distance portion and a spherical near portion and an attempt is made to "join" the two as aberration-free as possible by means of a transition zone.

Subsequently the attempt was made to combine the advantages of both principles of construction through the selection of the a spherical distance and near portions and for the most part avoiding the disadvantages thereof, with special consideration being given to the course of the increase in progression: with regard to this reference, by way of illustration, is made to FIG. 1 of the survey by B. Maitenaz in "The ophthamic optician", Sep. 17, 1966.

From the commercially available progressive ophthamic lenses with a progressive surface and those proposed in the patent literature, a common principle of construction has crystallized for about 8 years, that the as large as possible progressive distance portion has largely constant surface refractive power and as small as possible surface astigmatism at least on the main meridian, respectively in the central viewing-through area. The near portion also has largely constant surface refractive power in the prior art progressive ophthamic lenses and as small as possible surface astigmatism in the region of the main meridian.

Under "largely constant surface refractive power" and "as small as possible surface astigmatism" is understood that the refractive power in the distance portion of the prior art progressive ophthamic lenses does not fluctuate more than $\pm 0.3$ to 0.5 dpt and the surface astigmatism on the main meridian in the region of the progression zone and in the lower region of the distance portion is less than typically 0.25 dpt. Similar values also are true for the near portion, whereby the just given limits may be minimally higher in most ophthamic lenses due to the design.

The length of the progression zone, i.e. the length of the region in which the surface refractive power on the main meridian increases is usually dependent on the respective company policy, but never exceeds a value of 28 mm in any of the presently available ophthamic lens.

The typical course of the increase in refractive power for various addition values is shown in FIG. 6 of U.S. Pat. No. 4,315,673. In this instance the radius of curvature runs a long the main meridian in the case of astigmatism-free main merdians (umbilicus line) in proportion to the course in FIG. 6 of U.S. Pat. No. 4,315,673; in the case of main meridians on which there is a little surface astigmatism, the course of the radius of curvature deviates very little from the illustrated course of the surface refractive power without, however, resulting in fundamental changes.

Independent of which construction principle is utilized, it has been understood in the early stages of the development of progressive lenses that in certain cases it is necessary to compensate for oblique light bundle astigmatism occurring particularly in the upper region of the distance portion and in the lower region of the near portion with a corresponding surface astigmatism with opposite signs. With regard to this, reference is made to column 5, lines 61 to 66 of DE-PS 1 145 820 mentioned in the introductory section hereof. The progressive surface illustrated in FIGS. 1 to 4 of U.S. Pat. No. 2,878,721 has a surface astigmatism on the main meridian in the upper region of the distance portion and in the lower region of the near portion to compensate for the oblique light bundle astigmatism, with practically no other surface astigmatism being on the main meridian (the surface astigmatism on the remaining portion of the main meridian is smaller than 0.1 dpt).

The progressive surface described in EP 0 027 339 A3 also has in the lower region of the near portion a surface astigmatism. which apparently is intended to serve to compensate for the oblique light bundle astigmatism.

A similar proposal is also contained in DE 33 35 109 A1, respectively the corresponding U.S. Ser. Pat. No. 4,640,593 of this publication.

Previously the calculation of progressive ophthamic lenses was generally carried out in such manner that initially the course of the main meridian is given and the progressive surface was built up based on this main meridian, by way of illustration, with conical sections (DE-PS 20 44 639), periodic functions (DE-OS 28 15 936, respectively U.S. Pat. No. 4,315,673) or by means of spline functions (DE-PS 30 16 935 or "optical construction with splines" in OPTIK, Vol. 70, 1985, pp. 19-28).

Irregardless whether in optimization only the surface astigmatism or also in addition the oblique light bundle astigmatism is considered, surfaces always resulted whose surface properties were for the most part the same.

In particular, the surfaces known from U.S. Pat. No. 2,878,721, EP 0 027 339 A3 and DE 33 35 109 A1 have in common that in the distance and in the near portion the so-called sagittal radius of curvature, that is the radius of curvature of the surface perpendicular to the main meridian is practically constant so that only the radius of curvature in the direction of the main meridian, that is the so-called tangential radius of curvature, changes.

An element of the invention is that it was understood that independent of the details of the design of the surfaces and independent of the formalism for calculating the prior art progressive surfaces in use position, i.e. in consideration of the oblique light bundle astigmatism, offers no completely satisfactory results.

DESCRIPTION OF THE INVENTION

The object of the present invention is to provide a progressive ophthamic lens which has improved properties in the use position compared to prior art opthalmic lenses.

A solution to the aforementioned object in accordance with the present invention is set forth in claim 1 hereto. Embodiments of the present invention are described in the claims 2 to 10 hereto.

The present invention is based on the following realization:

If a progressive ophthamic lens is provided with a second surface in such a manner that the optical axis of the front surface penetrates through the geometric center of the round raw ophthamic lens, the peripheral thickness in the distance portion is greater than in the near portion. For this reason, progressive ophthamic lenses usually are provided with a vertical prism having a subjacent base and a size of approx. 0.25 cm/m to approx. 3.00 cm/m so that the peripheral thickness of the lens is "levelled". This means, however, that the optical axis penetrates the front surface below the geometrical center.

As a consequence, the oblique light bundle astigmatism in the distance portion essentially is related to the distance of the point of penetration of the beam of vision from the optical axis, whereas in the near portion, in which or near which the optical axis penetrates the front surface, the oblique light bundle astigmatism is essentially influenced by the power increased by the addition compared to the power of the distance portion.

Therefore, as it was also understood in accordance with the present invention, it is not possible to correct the distance and near portion with regard to the oblique light bundle astigmatism as was proposed in DE 33 35 109 A1, respectively in the corresponding U.S. Pat. No. 4 640 593. Moreover it is also not useful for the aforementioned reasons to provide compensation for the oblique light bundle astigmatism only in the near portion, as was suggested in EP 0 027 339.

In accordance with the present invention the method for the correction of the oblique light bundle astigmatism is as follows:

In the distance portion, the tangential radius of curvature, i.e. of the radius of curvature in the direction of the main meridian, increases with growing distance from the distance reference point. The sagittal radius of curvature, i.e. the radius of curvature perpendicular to the main meridian is, on the other hand, preferably practically constant for points on the main meridian (claim 3). Furthermore, it is preferable if as set forth in claim 4 hereto the radius of curvature in the direction of the main meridian changes on the main meridian practically linearly as a function of the distance of the distance reference point.

In the near portion, on the other hand, the sagittal radius of curvature is not constant. But rather, the sagittal radius of curvature on the main meridian becomes smaller almost linearly as a function of the distance from the near reference point. But rather the radius of curvature in the direction of the main meridian is either practically constant or increases on the main meridian in the near portion.

In other words, the following relationships are true for the individual radii, if the progressive surface is the front surface:

$R_{HM}(y_{BN} - 15 < y < y_{BN}) \geq R_{HM}(y = y_{BN})$
$R_{sag}(y < y_{BN}) < R_{sag}(y = y_{BN}) < R_{HM}(y = y_{BN})$
$|dR_{sag}/dl| \approx \text{const} > 0 \text{ for } y < y_{BN}$ the eye-facing surface is:

$R_{HM}(y_{BN} - 15 < y < y_{BN}) \leq R_{HM}(y = y_{BN})$
$R_{sag}(y < y_{BN}) > R_{sag}(y = y_{BN}) > R_{HM}(y = y_{BN})$
$|dR_{sag}/dl| \approx \text{const} > 0 \text{ for } y < y_{BN}$ With:
$R_{sag}$ standing for the sagittal radius of curvature
$R_{HM}$ standing for the tangential radius of curvature
$|dR_{sag}/dl|$ standing for the change of the sagittal radius of curvature in points on the main meridian and
$y_{BN}$ standing for the y-coordinate of the near reference point.

Although above the distance reference point the radius of curvature becomes larger along the main meridian so that the surface refractive power decreases (the decrease in surface refractive power is not necessarily proportional to the increase of the radius of curvature along the main meridian as, in particular, in the design according to claim 8 hereto the surface astigmatism increases), the overall power in the distance portion, however, remains practically constant in the use position, i e. for a progressive ophthamic lens before the eye.

Moreover, the surface astigmatism, which increases according to claim 8 hereto in the upper part of the distance portion, present along the main meridian compensates for the oblique light bundle astigmatism so that a larger, almost astigmatism-free distance portion is yielded in the use position.

As previously explained in the introductory section, practically constant power is to be understood to mean that the overall power of the ophthamic lens in the distance portion does not vary more than at the most 0.5 dpt. Also in agreement with the aforementioned explanation, largely astigmatism-free is understood to mean that the overall astigmatism does not exceed values of ±0.5 dpt and preferably of 0.25 dpt in a large central region having a diameter of approx. 20 mm about the distance reference point.

In any event, it is, however, preferable if, according to claim 2 hereto, the increase of the tangential radius of curvature in the distance portion along the main meridian is greater, the smaller the addition is, whereas the decrease of the sagittal radius of curvature can "ensue" in the near portion of the addition. This means that the following relationships have been fulfilled:

$R_{HM}(y_{BF}+15) - R_{HM}(y_{BF}) = B * (R_{HM}(y_{BF}) - R_{HM}(y_{BN}))$ $R_{sag}(y_{BN}) - R_{sag}(y_{BN}-15) = C * (y_{BF}) - R_{sag}(y_{BN}))$ with the factors B and C for eye-facing surfaces between approx. −1.5 dpt and −3.5 dpt with a base Curve of 6 dpt and between approx. −2.15 dpt and −4.5 dpt with a base curve of 8 dpt lying in the following ranges:

| B | C | Addition = $D_N - D_F$ |
|---|---|---|
| 0.8 ... 1.3 | 0.25 ... 0.8 | 0.5 ... 1.0 |
| 0.3 ... 0.8 | 0.25 ... 0.8 | 1.25 ... 2.0 |
| 0.1 ... 0.8 | 0.25 ... 0.8 | 2.25 ... 3.5 |

The invented design of a progressive lens, in which not primarily the surface properties, but rather the properties of the ophthamic lens in use position taking into account a thickness compensation prism are considered, leads to a completely new type of surface design not only along the main meridian, but also in the lateral regions of the ophthamic lens. In the prior art ophthamic lenses the attempt is made to ban the surface astigmatism to the lateral peripheral regions by decreasing the radius of curvature of horizontal, respectively orthogonal sections in the distance portion and in the upper region of the progression zone, respectively by increasing the radius of curvature in the corresponding sections in the lower region of the progression zone and of the near portion. Although it has been suggested that the variation of the radius of curvature reverses again at a certain distance, in the prior art progressive ophthamic lenses, however, the aforementioned course of radii at least is realized within a strip extending both sides of the main meridian. The lateral boundary of this strip is spaced at a distance of at least 12 to 14 mm from the main meridian.

In the case of the invented ophthamic lens, this variation of the radii of curvature of the intersecting lines of horizontal planes with the progressive surface in the upper region of the progression zone and in the distance portion is preferably not realized. At least outside a strip which is at most 16 mm wide, i.e. even at a distance of 8 mm from the main meridian, the radius of curvature of the intersecting lines of horizontal planes with the progressive surface becomes larger if the progressive surface is the convex front surface, respectively smaller if the progressive surface is the concave surface facing the eye (claim 5). Within this 16 mm wide strip, the radius of curvature of the intersecting lines may also vary in accordance with this principle of design, it may however also be constant or change like in the state of the art, i.e. may become minimally smaller if the progressive surface is the convex front surface, respectively may become larger if the progressive surface is the concave surface facing the eye.

In any case, it is preferable if according to claim 6 hereto at least outside a strip which extends along both sides of the main meridian and at most 20 mm wide, i.e. even at a distance of 10 mm from the main meridian, the following unequation is fulfilled:

$$R_{sag}(x,y=\text{const}) > R_{sag}(x=HM, y=\text{const})$$

with $R_{sag}(x,y)$ being the radius of curvature of the intersecting lines of planes, which are perpendicular to the main meridian, with the progressive surface. In the invented ophthamic lens—as previously explained —a surface astigmatism, which can serve to compensate for the oblique light bundle astigmatism in particular in the upper and in the lower part of the ophthamic lens, may be present along the entire main meridian. In this case, it is particularly preferable if according to claim 7 hereto along the entire main meridian is:

$$R_{sag}(x_{HM}, y_{HM}) \geqq R_{sag}(x_{HM}, y_{HM})$$

with again $R_{HM}$ standing for the radius of curvature along the main meridian at point $x_{HM}, y_{HM}$ on the main meridian, $R_{sag}$ standing for the radius of curvature of an intersecting line of the progressive surface with a plane, which is perpendicular to the main meridian, at a point $x_{HM}, y_{HM}$ on the main meridian.

According to claim 10 hereto, it is furthermore preferable if the tangential radius of curvature on the entire main i.e. the main meridian is not an umbilicus line.

BRIEF DESCRIPTION OF THE DRAWING

The present invention is described by way of example in the following section using a preferred embodiment with reference to the accompanying drawing, without the intention of limiting the scope or spirit of the inventive concept. Express reference is made to this drawing with regard to the disclosure of all the invented details not made more apparent in the text hereof.

FIG. 3 shows in a table the course of the radii of curvature of the intersecting lines of the progressive surface with horizontal planes for this preferred embodiment, FIG. 4 shows in a table the surface astigmatism along the main meridian for this preferred embodiment.

DESCRIPTION OF PREFERRED EMBODIMENTS

Figure 1:
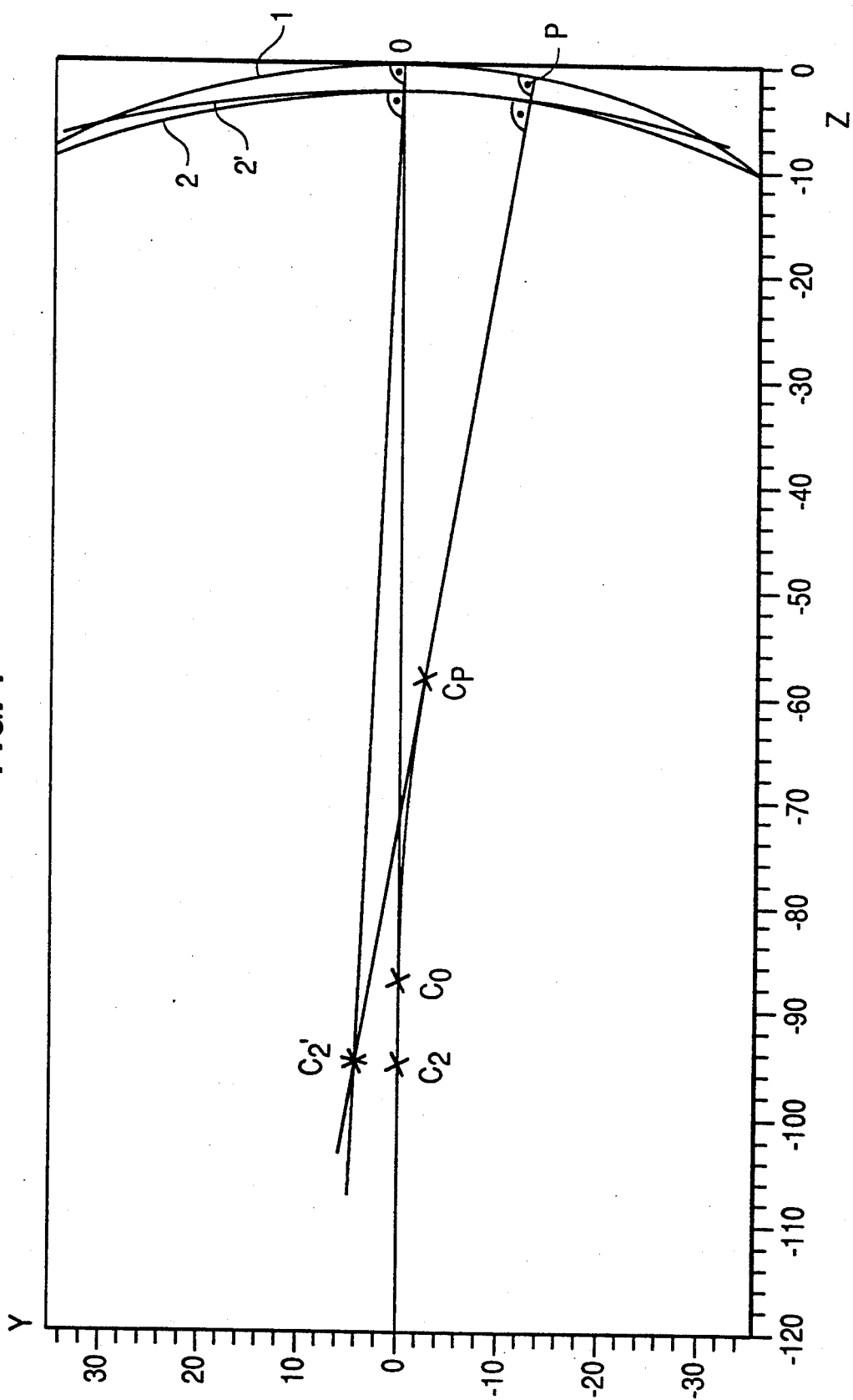
FIG. 1 shows a cross-section through a progressive ophthamic lens with a thickness reduction prism.

FIG. 1 depicts schematically a cross-section through a progressive ophthamic lens in order to explain the effect of a thickness reduction prism (also referred to as thickness compensation prism). The progressive surface is without limitation of the universality the front surface 1. In the center point 0 of the round raw ophthamic lens, the progressive surface has the center point of curvature $C_0$, which lies on the axis $y=0$ of the coordinate system y,z. If a surface the center point of curvature $C_2$ of which also lies on the axis $y=0$ is used as the eye-facing surface 2, thus although the optical axis $C_2C_0$ intersects the front surface 1 in the center point of the round raw ophthamic lens, the ophthamic lens, however, has in the upper part, i.e. in the region of the distance portion, a comparatively large thickness whereas in the near portion the eye-facing surface 2 intersects the front surface 1 "comparatively quickly" so that either the size of the near portion is limited or the ophthamic lens has a comparatively large peripheral thickness in the region of the distance portion.

If, on the other hand, the eye-facing surface 2' is tilted in such a manner that its center point of curvature $C_2'$ lies above y=0 the peripheral thickness of the ophthamic lens is nearly compensated for along the circumference of the lens. However, the optical axis no longer intersects the progressive surface 1 in the center point of the round raw ophthamic lens, but rather below the center point 0 in point P. The optical axis is in this case once again the connecting line of the center point of curvature $C_2'$ of surface 2' and of the center point of curvature $C_P$ of point P of the progressive surface 1. With the same minimal peripheral thickness, the center thickness can be reduced by the introduction of the thickness reduction prism.

Figure 2:
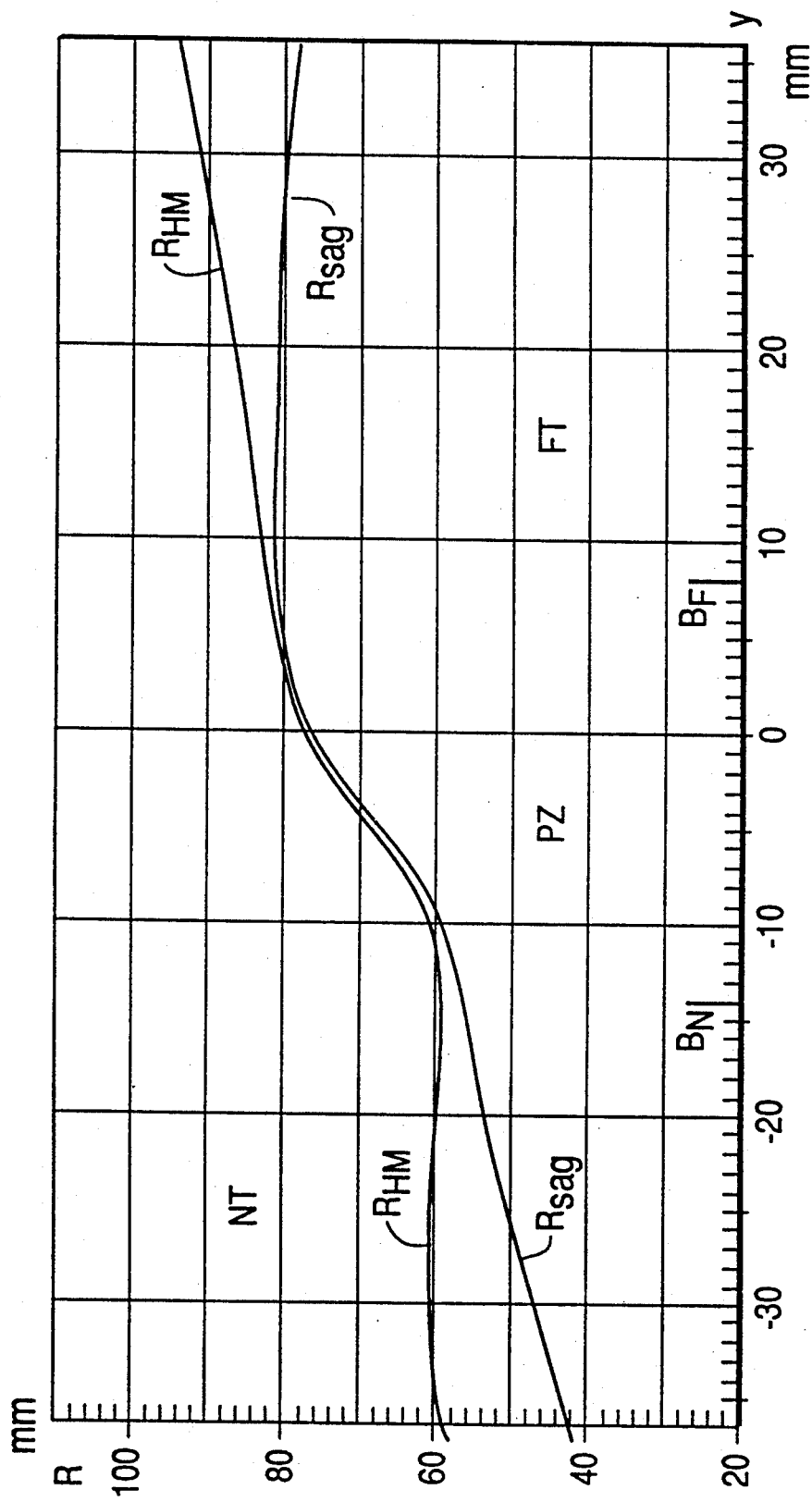
FIG. 2 shows the course of the tangential and sagittal radii of curvature along the main meridian for a first preferred embodiment of the present invention.

FIG. 2 depicts the course of the tangential radius of curvature $R_{HM}$ and of the sagittal one $R_{sag}$ in mm for a first preferred embodiment of the present invention in which the oblique light bundle astigmatism is compensated while taking the thickness compensation prism into consideration.

In this event the main meridian HM is a plane curve without the intention of limiting the scope or spirit of the overall inventive concept. The progressive surface is once again the convex front surface. The coordinate system is selected in such a manner that the main meridian fulfills the equation x=0. The y-axis runs "vertically" in the ophthamic lens—not illustrated in the use position—so that the radius of curvature R (in mm) is given as the function of the coordinate y(mm). The x-axis runs correspondingly "horizontally".

It is however expressly pointed out that the terms horizontally and vertically do not refer to the use position of the ophthamic lens in which the main meridian may in a prior art manner, by way of illustration, be tilted 8 degrees in relation to the vertical axis thus supporting the convergence of the viewing motion.

The preferred embodiment illustrated in FIG. 2 is the main meridian of a progressive surface, the so-called "base curve 6". With this is meant that with this progressive surface and a refraction index $n_e$, which is 1.604 without the intention of limiting scope or spirit of the overall inventive concept, with concave eye-facing surfaces, the power of which lies between approx $-1.5$ and $-3.5$ dpt, distance portion power ranging from $+4.0$ dpt to $+6.0$ dpt is "covered". The addition, i.e. the increase in power between the so-called distant reference point and the near reference point along the main meridian is in this preferred embodiment 3.0 dpt.

Furthermore, the DIN-defined distant reference point $B_F$ and the near reference point $B_N$ which lie at y=8 mm, respectively y=-14 mm in the illustrated preferred embodiment are shown in FIG. 2. Between $B_F$ and $B_N$ lies the progression zone PZ, above $B_F$ the distance portion FT and below $B_N$ the near portion NT.

From FIG. 2 can be seen that—like in conventional ophthamic lenses with a stabilized distance portion and near portion—both the sagittal and the tangential radius of curvature between $B_F$ and $B_N$ change from approx. 82 mm to approx. 60 mm thus yielding the desired addition of 3 dpt.

Unlike in conventional ophthamic lenses with a stabilized distance and near portion, but also unlike in prior art ophthamic lenses which have a surface astigmatism for compensation of the oblique light bundle astigmatism in the distance and/or near portion, in the invented ophthamic lens the tangential radius of curvature rises practically linearly above the distant reference point $B_F$ and attains, by way of illustration, at y=24 mm a value of 88.7 mm and at y=32 a value of 92.4 mm.

The sagittal radius of curvature is, on the other hand, above the distant reference point $B_F$ almost constant, respectively decreases minimally Below the near reference point $B_N$, the tangential and the sagittal radius of curvature change exactly in reverse as in the distance portion:

In the near portion, the tangential radius of curvature $R_{HM}$ is practically constant and attains, by way of illustration, at y=-20 mm a value of 60.2 mm, i.e. it changes altold only about 1 mm.

The sagittal radius of curvature, on the other hand, also decreases pratically linearly below the near reference point $B_N$ and attains at y=-30 mm a value of approximately 47 mm.

FIG. 3 shows in a table the course of the radii of curvature of the intersecting lines of the progressive surface with horizontal planes y=const. As in the illustrated preferred embodiment the progressive surface—without the intention of limiting the scope or spirit of the overall inventive concept—is symmetric, only the values for $x \geq 0$ are given. Naturally, the present invention can also be utilized with unsymmetric surfaces which, by way of illustration, are horizontally symmetric in use position, i.e. with a tilted main meridian.

As can be seen in the table, the radius of curvature of the intersecting lines in the near portion NT and in the lower region of the progression zone PZ varies similar to the progressive ophthamic lens known from DE 37 16 201 A1. In the upper region of the progression zone PZ and in the distance portion FT, the course of the radius of curvature of the intersecting lines of the progressive surface with horizontal planes x=const. however deviates totally from the course of the prior art surfaces:

Even for values of $x \geq 12$ mm, on the major part of the surface however even at values of x>6 mm, the radius of curvature for the intersecting lines of horizontal planes (y=const.) with the progressive surface becomes larger with increasing distance from the main meridian (x=0). In the prior art surfaces, on the other hand, the radius of curvature becomes smaller down to values of at least x=14-16 mm!

In particular, on the major part of the surface at values of $x \geq 6$ mm, at any rate however at values of $x \geq 14$ mm, the radius of curvature of the intersecting lines is larger than the radius of curvature of these intersecting lines at x=0 mm.

FIG. 4 shows in a table the course of the surface astigmatism along the main meridian x=0. As can be seen in FIG. 3, the surface astigmatism on the main meridian in the distance portion FT attains values of 0.5 dpt and in the near portion even values of more than 1.0 dpt.

Figure 5:
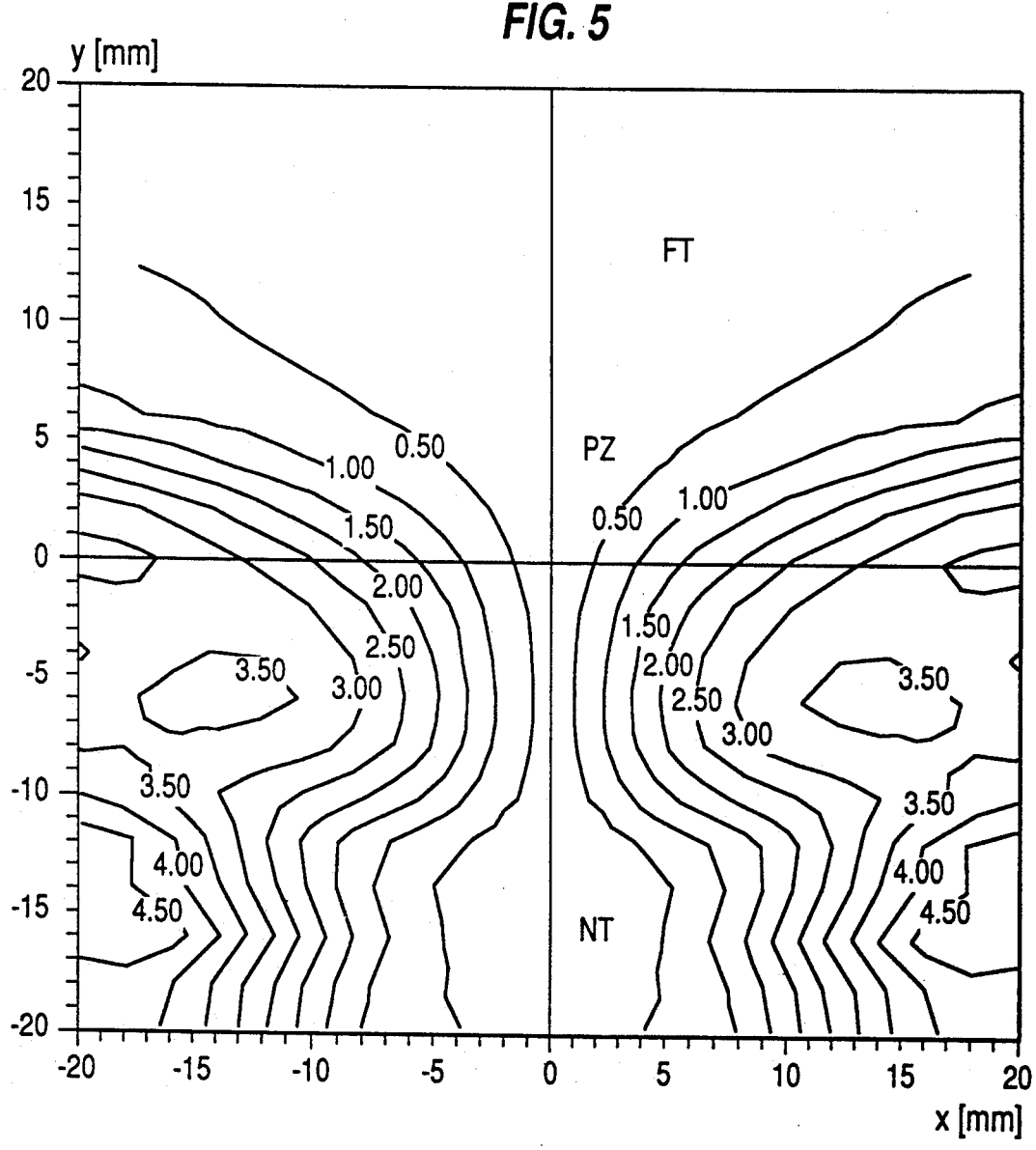
FIG. 5 shows the (overall) astigmatism in the use position for this preferred embodiment.

Nonetheless—as FIG. 5 shows, in which lines of the same astigmatism are plotted as the function of the coordinates x and y—the overall astigmatism in the use position, which is yielded by the "addition" of the surface astigmatism and the oblique light bundle astigmatism, is very small. In particular the wide region in the distance portion and the wide near portion bordered by the lines with an astigmatism of 0.5 dpt must be pointed out.

FIG. 6 to 10 show for the purpose of further elucidating the present invention the course of the tangential radius of curvature $R_{HM}$ and of the sagittal radius of curvature $R_{sag}$ along the main meridian (x=0) for further preferred embodiments with a deviating base curved respectively a deviating addition. In all the embodiments, the referactive index $n_e=1.604$. This does into however means that the present invention is restricted to such values of the refractive index; but rather the surfaces designed in accordance with the present invention can also be utilized for ophthamic lenses with a deviating refractive index such as, by way of illustration, 1.7 or 1.5 (CR 39), respectively 1.525 (conventional silicate lenses).

Figure 6:
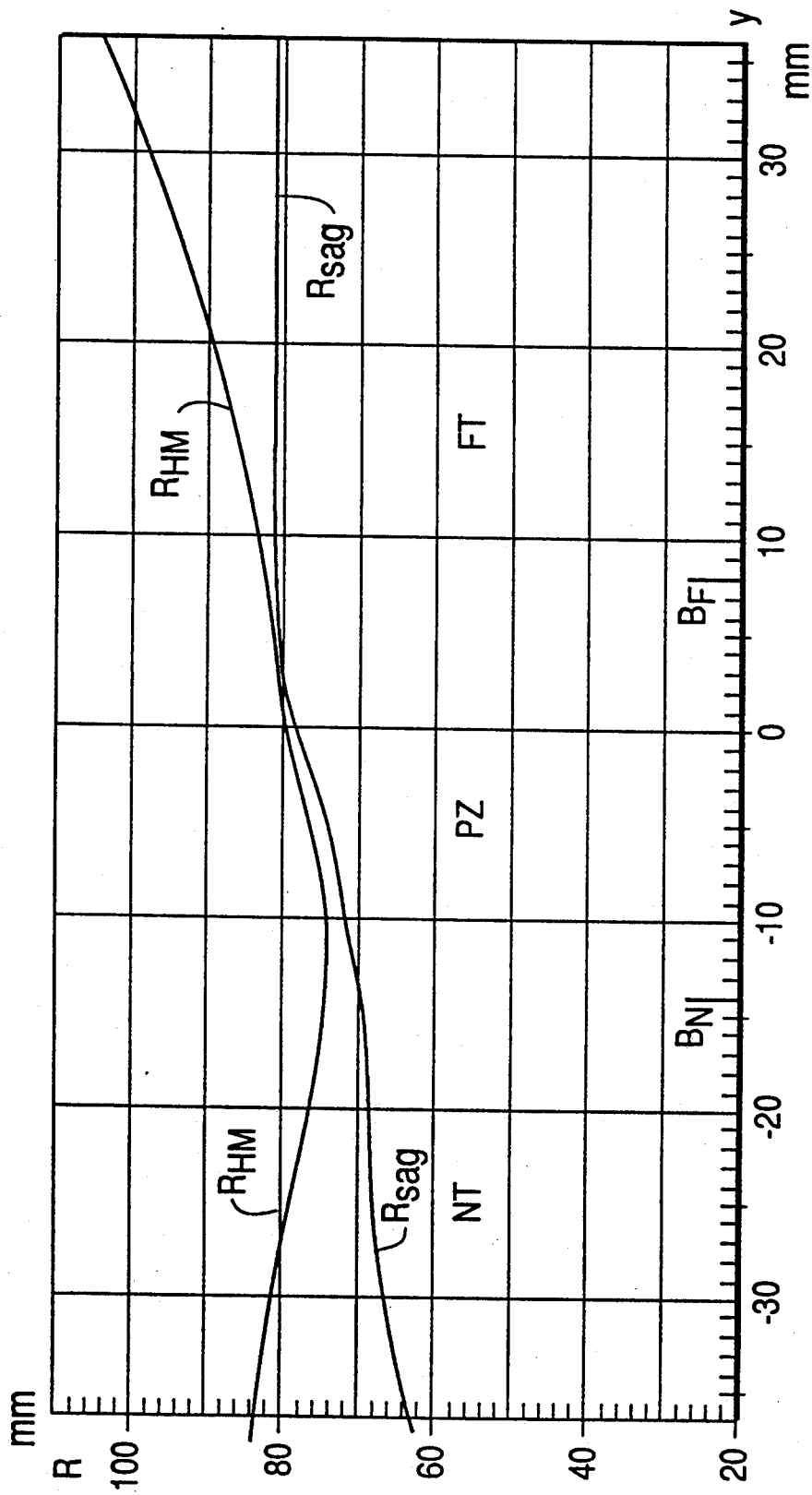
FIGS. 6 to 10 show the course of the tangential and sagittal radii of curvature along the main meridian for further preferred embodiments with deviating additions and/or base curves.
Figure 7:
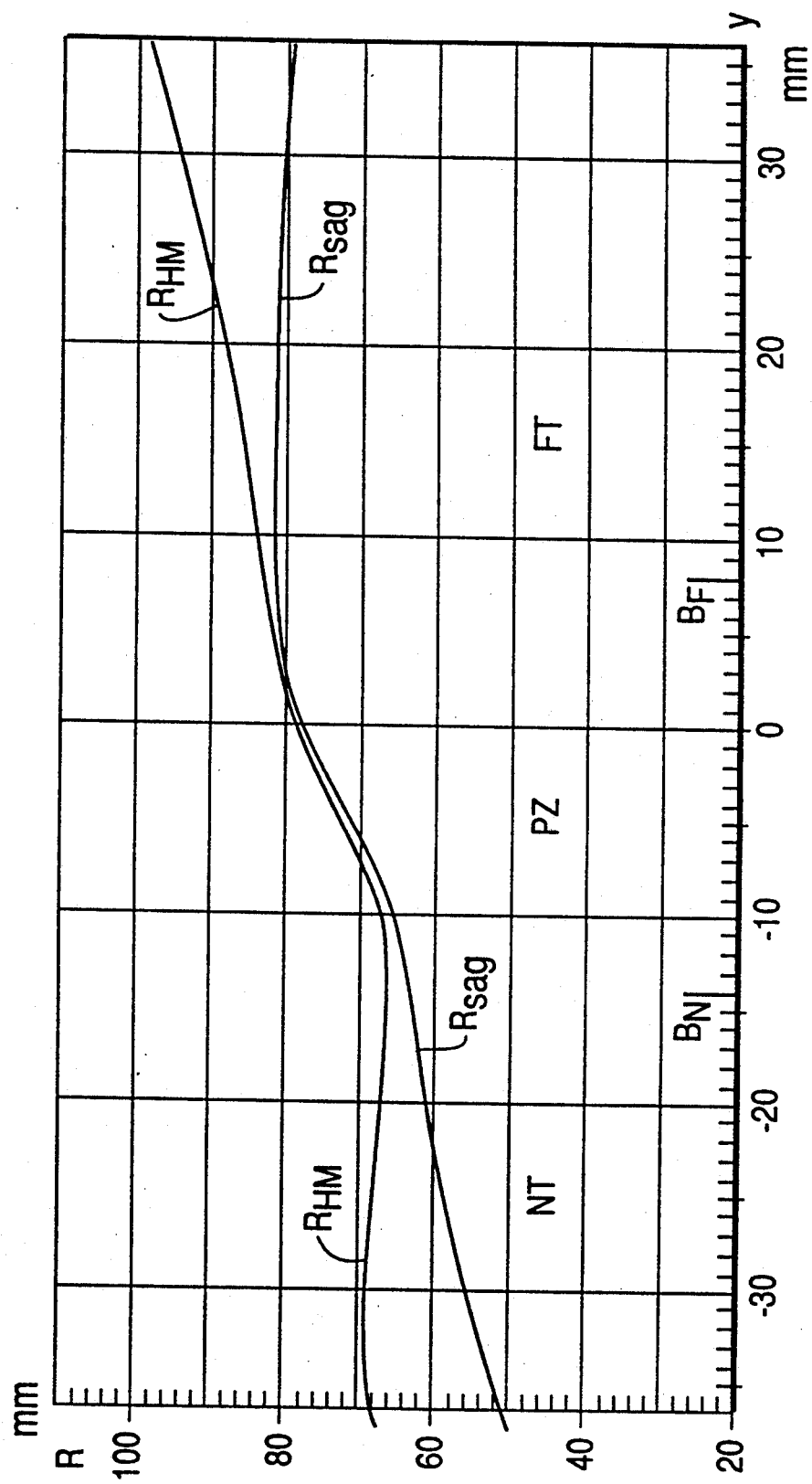
Figure 8:
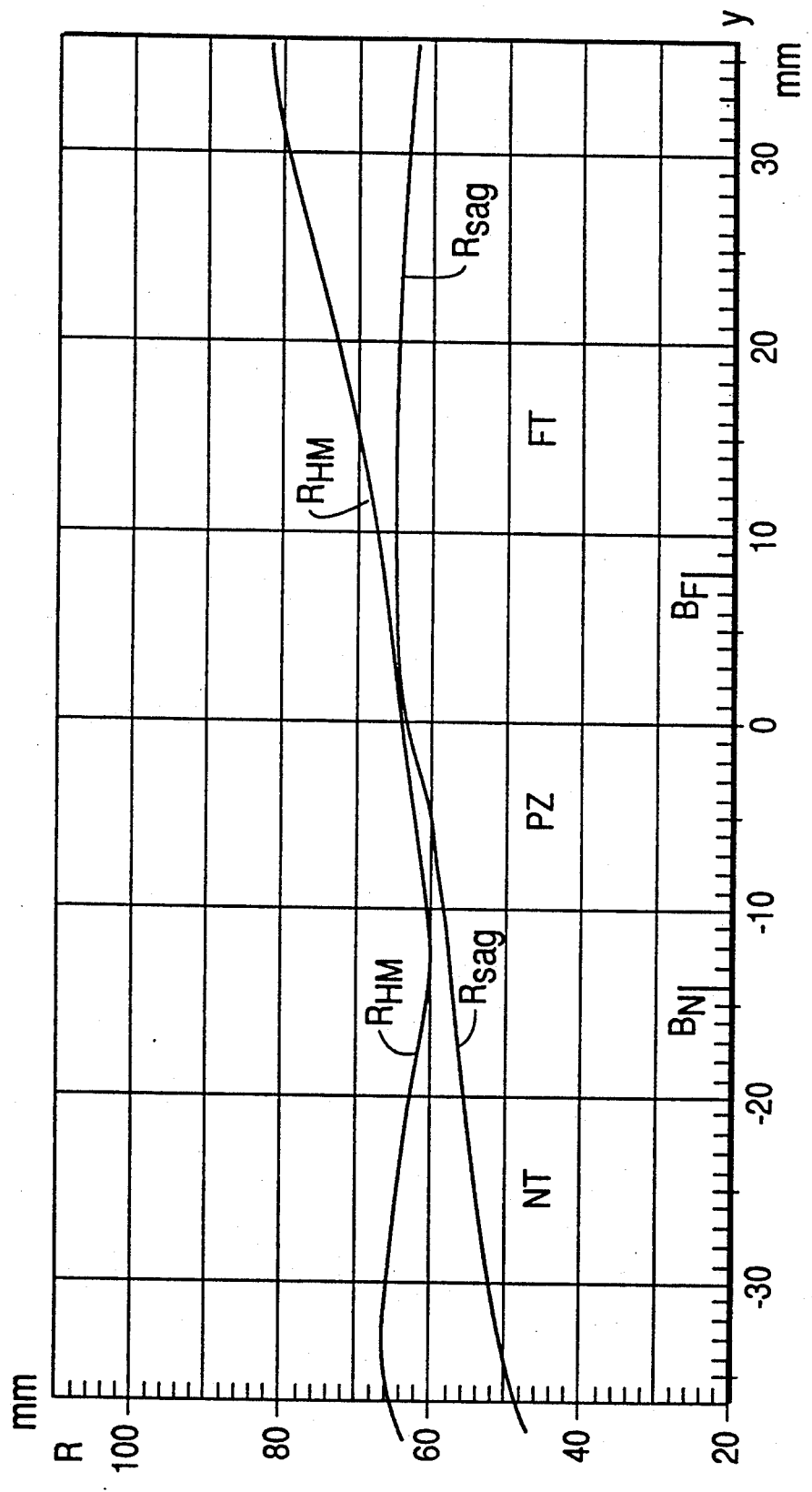
Figure 9:
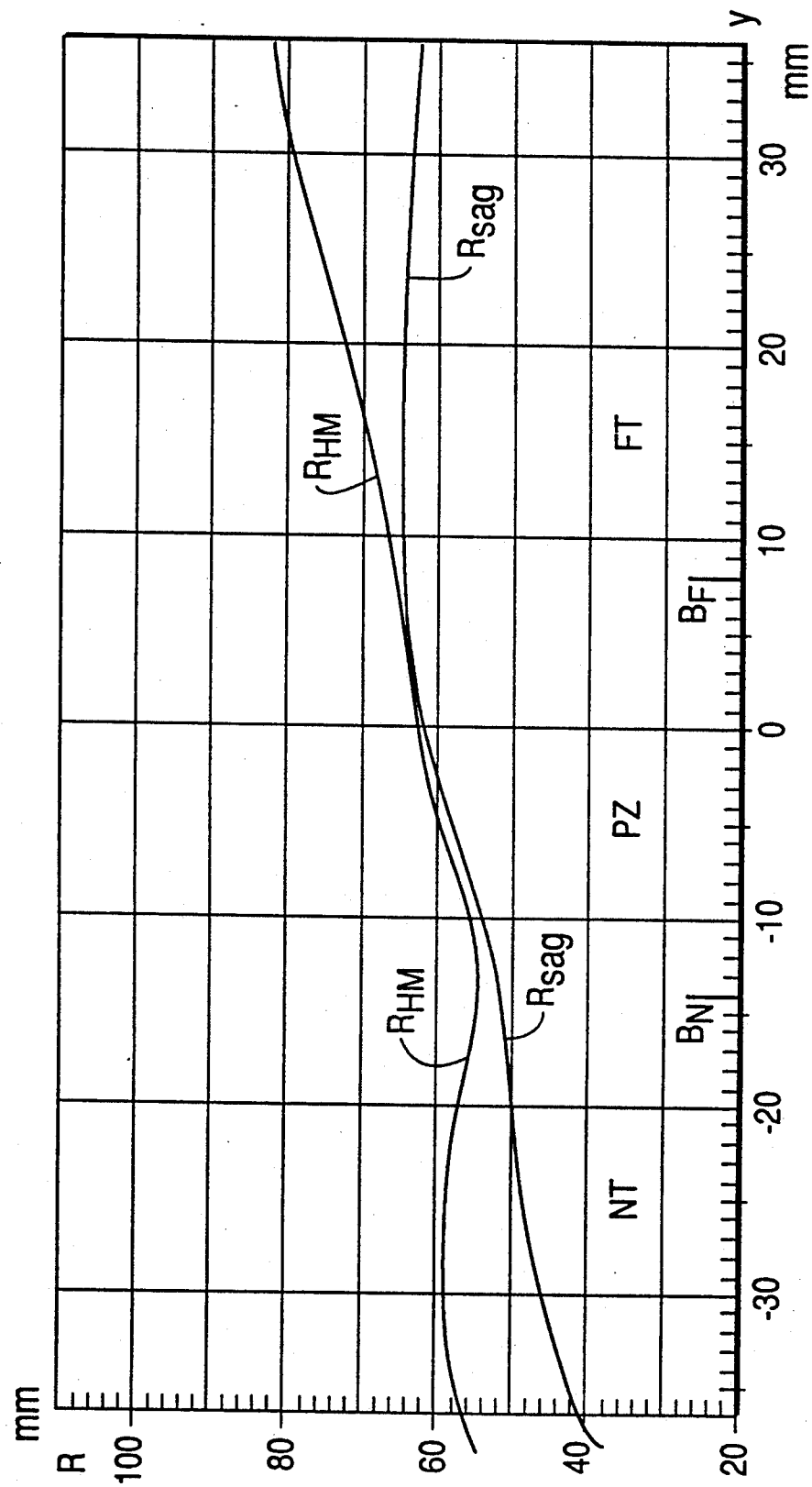
Figure 10:
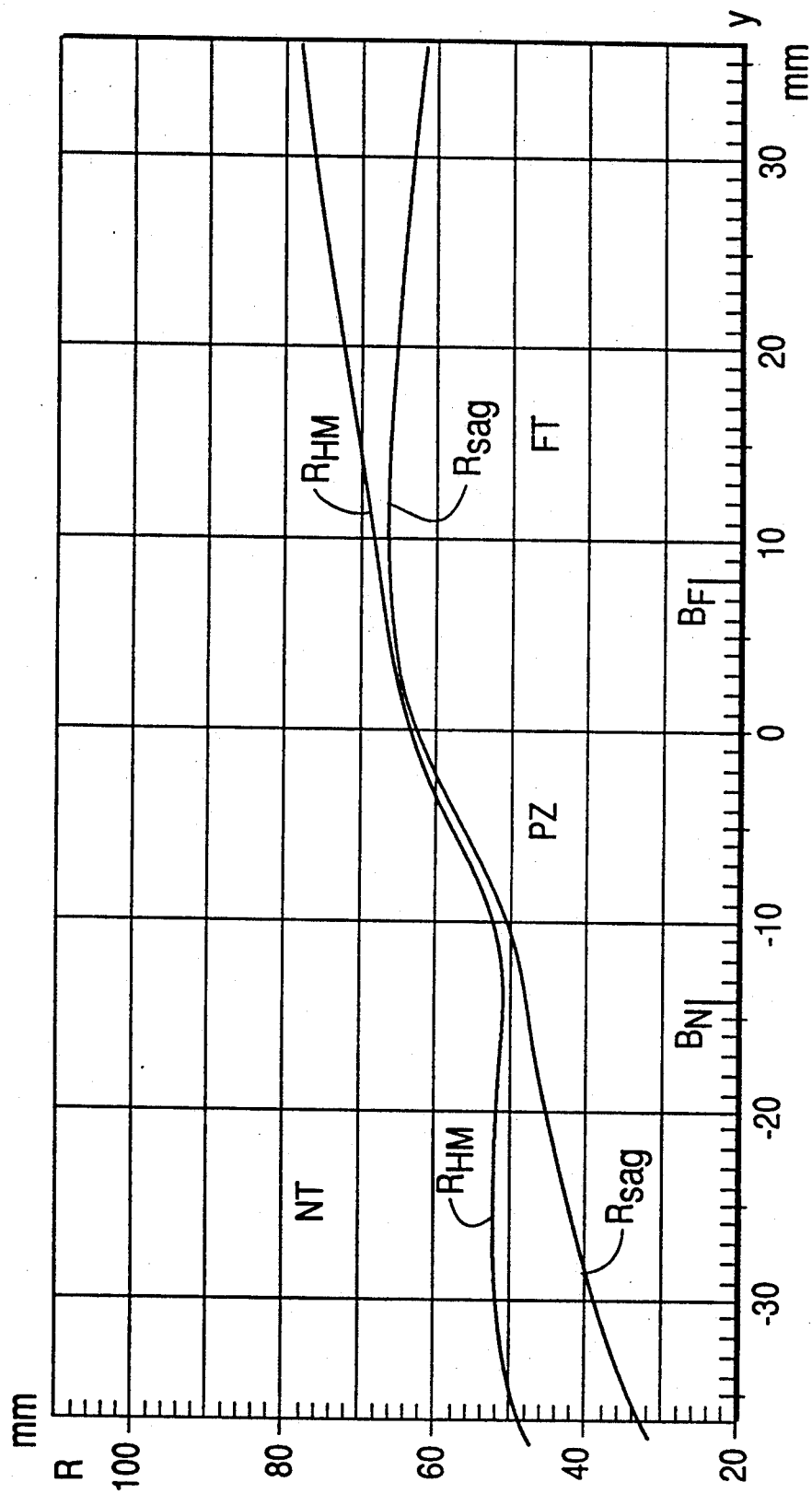

In particular, the courses of the radii o curvature for the base curve 6 and the addition 1 dpt and 2 dpt are illustrated in FIGS. 6 and 7, for the base curve 8 and the addition 1 dpt, 2 dpt and 3 dpt in FIGS. 8 to 10. With base curve 8 is meant that with such a progressive surface and eye-facing surfaces having a power between approx. $-2.15$ dpt and $-4.38$ dpt, the range up to a distance portion power of approx. 8 dpt is covered.

As can be seen in FIGS. 6 and 7, the surfaces with a smaller addition that the surface shown in FIG. 2 have a similar course of the tangential radius of curvature in the distance portion and of the sagittal radius of curvature in the distance portion and near portion. A deviation only occurs in the course of the tangential radius of curvature $R_{HM}$ *in the near portion, which increases more distinctly with a decreasing addition below the near reference point.*

This is also true for the surfaces of the base curve 8 illustrated in FIGS. 8 to 10. In these surfaces, only the course of the sagittal radius of curvature in the distance portion indicates a minimal deviation compared to the corresponding surfaces of the same addition of base curve 6: the sagittal radius of curvature decreases more distinctly with increasing distance from the distant reference point $B_F$ than in the surfaces of base curve 6.

In particular, it can be seen from FIGS. 2 and 6–10 that the following relationships are true for the radii of curvature $R_{HM}$ and $R_{sag}$ of the progressive surfaces in the points the main meridian:

$$R_{HM}(y_{BF}+15) - R_{HM}(y_{BF}) = B^*(R_{HM}(y_{BF}) - R_{HM}(y_{BN}))$$

$$R_{sag}(y_{BN}) - R_{sag}(y_{BN}-15) = C^*(R_{sag}(y_{BF}) - R_{sag}(Y_{BN}))$$

with $B \approx 0.17...1$ and $C \approx 0.54 \pm 0.1$

The present invention was described hereinbefore using preferred embodiment without the intention of limiting the scope or spirit of the overall inventive concept.

What is claimed is:

1. A progressive opthalmic lens having positive distance portion power, in which at least one surface is designed as a progressive area, and a distance portion (FT) intended for distant vision having practically constant distance portion power and a near portion (NT) intended for near vision having practically constant near portion power including a progression zone (PZ), in which the surface refractive power increases from the surface refractive power ($D_F$) present at the distant reference point ($BN_F$) along a curved of plane main meridian (HM) to the surface refractive power ($D_N$) present at a near reference point ($B_N$), having the following features:

in the lower region of the progression zone and in the near portion, the radius of curvature of the intersecting lines of horizontal planes (y=const) with the progressive surface becomes larger, if said progressive surface is the convex front surface, respectively smaller, if said progressive surface is the concave surface facing the eye, at least within a strip extending on both sides of said main meridian (HM) with increasing distance from said main meridian (HM), for the reduction of the thickness of said opthalmic lens is provided a vertical prism having a size ranging from approx. 0.25 cm/m to approx. 3.00 cm/m, which has a subjacent base so that the optical axis is moved in the direction of the near portion (NT), for the compensation of the oblique light bundle astigmatism said progressive surface has at least in the upper region of the distance portion and in the plower region of the near portion a surface astigmatism, with the following relationships being true for the radius of curvature $R_{HM}$ of said progressive surface along the main meridian (HM) and the radius of curvature $R_{sag}$ perpendicular to the main meridian if said progressive surface is said front surface:

$$R_{HM}(y_{BN}-15 < y < y_{BN}) \geqq R_{HM}(y=y_{BN})$$
$$R_{sag}(y < y_{BN}) < R_{sag}(y=y_{BN}) < R_{HM}(y=y_{BN})$$
$$|dR_{sag}/dl| \approx \text{const} > 0 \text{ for } y < y_{BN}$$

said surface facing the eye:

$$R_{HM}(y_{BN}-15 < y < y_{BN}) \leqq R_{HM}(y=y_{BN})$$
$$R_{sag}(y < y_{BN}) > R_{sag}(y=y_{BN}) > R_{HM}(y=y_{BN})$$
$$|dR_{sag}/dl| \approx \text{const} > 0 \text{ for } y < y_{BN}$$

with $|dR_{sag}/dl|$ being the variation of said curvature perpendicular to said main meridian in points on said main meridian and $y_{BN}$ the y-coordinates of said near reference point.

2. An ophthamic lens according to claim 1, wherein for said radii of curvature $R_{HM}$ and $R_{sag}$ of said progressive surface in points on said main meridian the following relationships are true if said progressive surface is said front surface:

$$R_{HM}(y_{BF}+15) - R_{HM}(y_{BF}) = B^*(R_{HM}(y_{BF}) - R_{HM}(y_{BN}))$$

$$R_{sag}(y_{BN}) - R_{sag}(y_{BN}-15) = C^*(R_{sag}(y_{BF}) - R_{sag}(y_{BN}))$$

with the factors B and C for eye-facing surfaces between approx. $-1.5$ dpt and $-3.5$ dpt with a base curve of 6 dpt and between approx. $-2.15$ dpt and $-4.5$ dpt with a base curve of 8 dpt lying in the following ranges:

| B | C | Addition = $D_N - D_F$ |
|---|---|---|
| 0.8 ... 1.3 | 0.25 ... 0.8 | 0.5 ... 1.0 |
| 0.3 ... 0.8 | 0.25 ... 0.8 | 1.25 ... 2.0 |
| 0.1 ... 0.8 | 0.25 ... 0.8 | 2.25 ... 3.5 |

3. An ophthamic lens according to claim 1 or 2, wherein said radius of curvature $R_{sag}$, the radius of curvature running perpendicular to said main meridian in said distance portion, is practically constant.

4. An ophthamic lens according to claim 1 or 2, wherein for said radius of curvature $R_{HM}$ running in the direction of said main meridian in said distance portion $$dR_{HM}/dl \sim const > 0 \text{ for } y > y_{BF}$$

is true.

5. An ophthamic lens according to claim 1 or 2, wherein in the upper region of said progression zone and in said distance portion the radius of curvature of the intersecting lines of horizontal planes (y=const) with said progressive surface
   becomes larger, if said progressive surface is said convex front surface, respectively
   smaller if said progressive surface is said concave surface facing the eye,
   at least outside an at most 16 mm wide strip extending on both sides of said main meridian (HM) with increasing distance from said main meridian (HM).

6. An ophthamic lens according to claim 5, wherein at least outside an at most 20 mm wide strip extending on both sides of said meridian $$R_{sag}(x,y=const) \; R_{sag}(x=HM,y=const)$$

is true, with $R_{sag}(x,y)$ being said radius of curvature of the intersecting lines of planes which are perpendicular to said main meridian with said progressive surface.

7. An ophthamic lens according to claim 1 or 2, wherein along said entire main meridian $$R_{HM}(x_{HM}, y_{HM}) \geq R_{sag}(x_{HM}, y_{HM})$$

is true, with
   $R_{HM}$ standing for said radius of curvature alon said main meridian at point $x_{HM}$, $y_{HM}$ on said main meridian,
   $R_{sag}$ standing for said radius of curvature of an intersecting line of said progressive surface with a plane which is perpendicular to said main meridian at a point $x_{HM}$, $y_{HM}$ on said main meridian.

8. An ophthamic lens according to claim 1 or 2 wherein said surface astigmatism on said main meridian in the upper region o said distance portion and in the lower region of said near portion exceeds values of 0.3 dpt, respectively.

9. An ophthamic lens according to claim 8, wherein said surface astigmatism on said main meridian attains values of 0.5 dpt in said distance portion and of 1.0 dpt and more in said near portion.

10. An ophthamic lens according to claim 1 or 2, wherein said surface astigmatism is unequal zero on said entire main meridian.

* * * * *